United States Patent [19]

Krewson, Jr.

[11] 4,301,661
[45] Nov. 24, 1981

[54] THERMAL SIGNAL DEVICE WITH TIMER

[76] Inventor: Walter I. Krewson, Jr., 30708 Lake Rd., Bay Village, Ohio 44140

[21] Appl. No.: 899,657

[22] Filed: Apr. 24, 1978

Related U.S. Application Data

[63] Continuation-in-part of Ser. No. 780,468, Mar. 23, 1977, abandoned.

[51] Int. Cl.³ .................. G01K 13/00; F25D 21/02
[52] U.S. Cl. .................. 62/130; 165/11 R; 236/94
[58] Field of Search .......... 62/129, 126, 130, 125; 165/11; 340/585, 588; 236/94

[56] References Cited

U.S. PATENT DOCUMENTS

| | | | |
|---|---|---|---|
| 1,188,603 | 6/1916 | Amrhein | 62/129 |
| 2,439,331 | 4/1948 | Bean | 62/129 X |
| 2,766,439 | 10/1956 | Palm | 62/129 X |
| 3,007,320 | 11/1961 | Henkel | 62/126 |
| 3,510,860 | 5/1970 | Christman | 62/129 X |
| 4,107,672 | 8/1978 | Van Riemsdijk | 62/129 X |

Primary Examiner—William E. Wayner
Attorney, Agent, or Firm—Watts, Hoffmann, Fisher & Heinke Co.

[57] ABSTRACT

An apparatus for indicating a rise in the temperature within a compartment of a refrigerator, above a pre-determined desired degree of temperature in the compartment. A hermetically sealed thermal responsive device is positioned within the compartment and is pre-set to close an electrical switch whenever the temperature within the compartment exceeds the pre-set temperature. The switch is in circuit with an indicating means and is normally open so long as the temperature in the compartment is below the pre-set temperature. A container positioned outside the refrigerator houses the indicating apparatus and a test switch for determining the operativeness of the system. A timer is included which indicates how long current has been flowing within the circuit to indicate how long the temperature within the compartment has exceeded the pre-set level.

10 Claims, 5 Drawing Figures

THERMAL SIGNAL DEVICE WITH TIMER

BACKGROUND OF THE INVENTION

This application is a continuation-in-part of application Ser. No. 780,468 entitled "Thermal Signal Device", filed Mar. 23, 1977, now abandoned.

In the case of a refrigerator such as a freezer chest having provision for storing food stuffs for use at some future time, any abnormal condition such as an increase in temperature above a predetermined desirable degree of temperature might go unnoticed with the result that spoilage of food stuffs may be very substantial. Attempts have been made to provide warning systems which would indicate an abnormal temperature condition within the freezer compartment of a refrigerator, but one device which has been brought to my attention is a complex structure which is connected to the mechanical unit which is employed for maintaining a low temperature within the compartment. Such system is shown in U.S. Pat. No. 2,447,893 which was issued Aug. 24, 1948 for alarm system for electric refrigerators.

Another such system which is being currently sold includes a thermal responsive device which is positioned within a refrigerator compartment and is connected in circuit with an indicator, the latter of which is positioned outside the refrigerator. In such system, whenever the indicator is activated, due to an increase in temperature in a compartment above a pre-determined degree, it is necessary to reset the system manually at frequent intervals until the temperature in the compartment is restored to the normal desired degree. Additionally, in such system, the indicator is directly connected to the thermal responsive device and must be positioned in close proximity to the refrigerator. Such indicator comprises an audible signal which may not be heard if the refrigerator is in a remote place, such as in another building.

Two other temperature responsive control systems are those disclosed in U.S. Pat. No. 3,510,860 to Christman and U.S. Pat. No. 2,439,331 to Beau. Those devices contain direct current batterys in their control circuit but also require an external source of energy to control operation of the respective systems.

SUMMARY OF THE INVENTION

The invention of the present application is the provision of a simple system for indicating a rise in a temperature in excess of a predetermined degree of temperature in the freezer compartment, together with an alarm indicating means which can be located at a point remote from the refrigerator, and which can be readily installed in existing refrigerators and connected to a source of electrical energy for actuating the alarm. A container which houses the indicating means may also house a relatively small dry cell unit as a source of electrical power, and may house a test switch for selectively determining the operability of the system. The container also includes connections which may be plugged into the circuit from the thermostat and the arrangement is such that no power is consumed so long as the temperature in the refrigerator compartment remains below that for which the thermostat is pre-set. The invention further includes a timer for indicating how long current has been flowing in the circuit in order that user knows how long the temperature has been above the present range.

DESCRIPTION OF THE INVENTION

Figure 1:
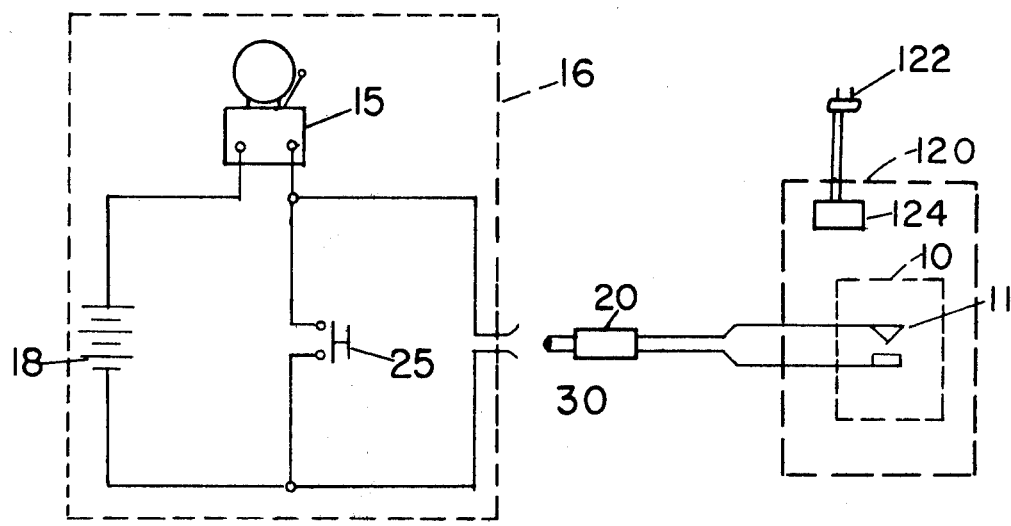
FIG. 1 is a wiring diagram for the system of the invention.

The invention, as illustrated in the wiring diagram of FIG. 1, includes a pre-set hermetically sealed thermostat, indicated in general at 10, which contains a switch 11, the circuit for which is normally open so long as the ambient temperature within the refrigerator compartment in which the thermostat is placed is below that for which the thermostat is pre-set. An alarm indicating means indicated at 15 is positioned outside the refrigerator compartment 120 and within a casing or container indicated by the dotted lines 16. The refrigerator is powered by means of an external source of energy such as 110 volt alternating voltage as indicated by an electrical connector 122. This external energy source powers a compressor and a internal thermostat 124 controlling temperature fluctuation within the refrigerator. A second source of electrical energy, such as a dry cell battery, is indicated at 18 in a circuit 19 with the indicator means and with the thermostat through a lock-in jack connection 20. A test switch 25 is connected in circuit with the source of energy and the indicator so as to test the operability of the system.

A thermostat which was found to be satisfactory is that designated as Model 44T Style 46542 as manufactured by Thermo-O-Disc Inc. Subsidiary of Emerson Electric Co., Mansfield, Ohio 44907. The thermostat is hermetically sealed and is pre-set by the manufacturer so as to close the normally open switch 11 whenever the temperature within the refrigerator compartment exceeds that for which the thermostat is pre-set. When the temperature within the compartment returns to a point below the pre-set level the switch 11 re-opens. The leads from the switch 11 terminate in a two-conductor plug 20 such as that designated as catalog No. 1-480305-0 manufactured by Amp Special Industries, Pittsburgh, Pa. 15220. The receptacle for the plug 20 is designated 30 and comprises a plug such as that identified as catalog No. 1-480304-0 manufactured by Amp Special Industries, Pittsburgh, Pa. 15220.

The indicating means 15 preferably comprises a solid state audio buzzer, such as model X10w12 manufactured by Projects Unlimited, Inc., of Dayton, Ohio, and the push button switch 25 preferably is one identified as Catalog No. MSPS-103L—normally open—and manufactured by Alco Electronic Products Inc., North Andover, Mass. 01845. The source of energy 18 may be a 9 VDC transistor battery which is generally available for transistor radios.

Figures 4, 5:
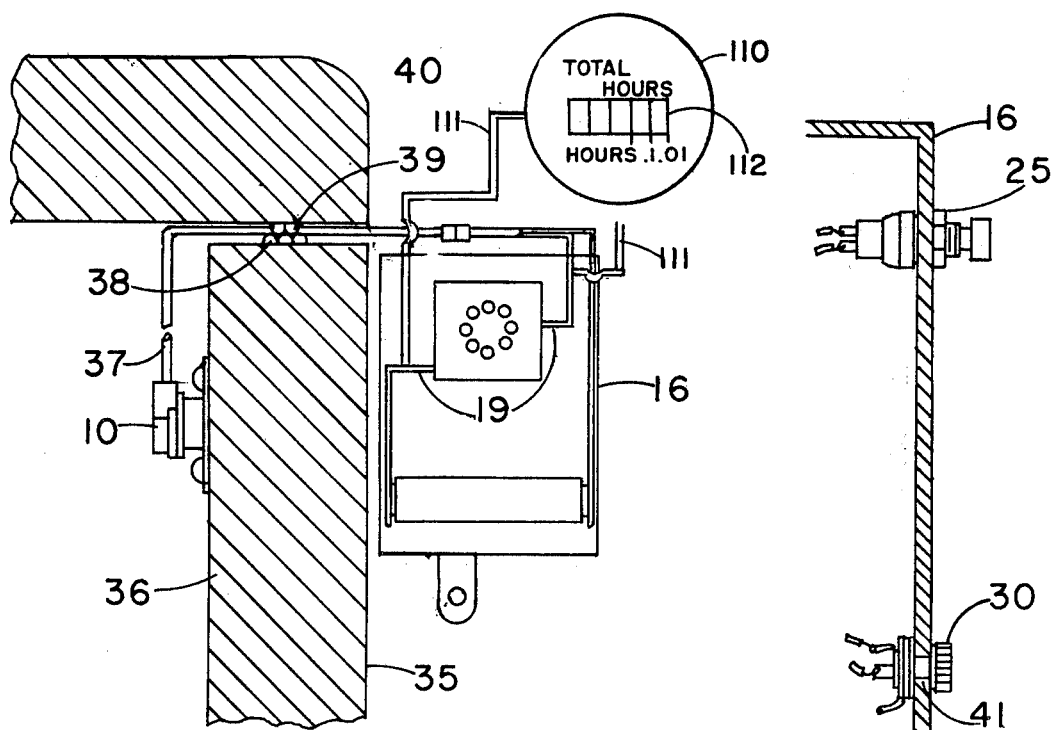
FIG. 4 is a sectional view through a portion of a refrigerator having one form of the invention applied thereto.
FIG. 5 is a fragmentary elevational view of a portion of a container which houses the alarm indicating means.

The container 16 may be a plastic or metal box, such as that designated as Style No. 507, as manufactured by Gary Plastic Packaging Corporation of Bronx, NY., As shown in FIG. 4, the container 16 may be mounted adjacent the exterior surface 35 of a refrigerator wall 36 in any suitable manner. The thermostat 10 is mounted within the refrigerator compartment, and the leads therefrom extend in the form of a cable 37 between the resilient sealing members 38 and 39 on the refrigerator wall 36 and door 40 respectively. In the illustration of FIG. 1, the terminal plug 20 is plugged directly into the socket 30.

As shown in FIG. 4 the system may include a timing device 110. The timer includes electrical leads 111 attached to the circuit 19 within the container 16. The timer 110 detects the presence of electrical current within the circuit 19 and indicates on a meter face 112 the number of hours (with sensitivity in hundredths of an hour) current has been flowing. Due to the operation of the switch within the thermostat current flows only when the temperature within the refrigerator is above a pre-set level. The meter, therefore, indicates how long the refrigerator temperature has been too high. One -hour meter which could perform this function is the Model T6B612DA DC Hour Meter -6 Volt DC, 30MA, six digit read out made by ENM Company. Other time meters could perform this function and might include solid state constant reading, resettable or non-resettable devices.

In FIG. 5, which illustrates one wall of the container 16, the receptacle 30 has an axially extending opening 41 for receiving the terminals of the plug 20. Additionally, the wall of the casing 16 has the test switch 25 mounted thereon for closing the circuit manually between the source of electrical energy and the indicating means, whenever desired, for testing the operability of the system.

Figure 2:
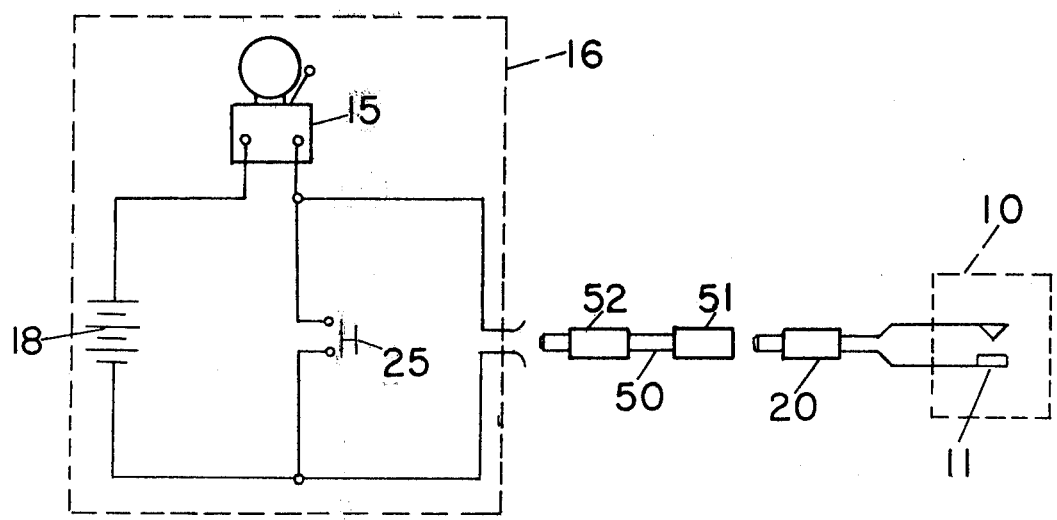
FIG. 2 is a wiring diagram for a modified form of the invention.

FIG. 1 illustrates a system wherein the housing for the alarm indicator is positioned in close proximity to the refrigerator. In many instances, however, the refrigerator, particularly the freezer type of refrigerator, is located at a point remote from the living quarters of a residence, with the result that any audible indicating alarm might not be heard in time to remedy an abnormal condition of temperature within the refrigerator. The present invention, however, is well adapted for positioning the housing or container 16 at any desired distance from the refrigerator, as is indicated in FIG. 2, wherein a cable type conductor extension 50 of any desired length may have a socket connector 51 for receiving the plug 20 and may have a plug 52 at the opposite end for plugging into the socket 30 in the container. In such case, the test switch 25 is convenient for testing the operability of the system.

Figure 3:
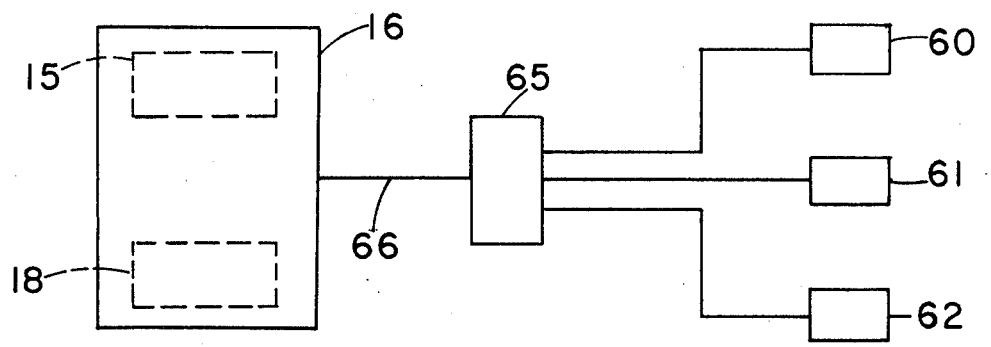
FIG. 3 is a wiring diagram of an alarm system for multiple refrigerator units.

The invention is also suitable for indicating the temperature in multiple freezer units by the use of the single alarm indicator, as shown for example in FIG. 3, where multiple refrigerator units such as 60, 61 and 62 respectively, have the conductors from the thermostats therein connected to a junction block 65. A common conductor 66 connects the block to the alarm indicating means and to the source of energy within the casing. By means of such arrangement, the indicating means would be actuated whenever the temperature of any of the multiple units exceeds that for which the thermostat therein is pre-set.

An advantage of the present invention is the fact that the system may be installed in any freezer, either new or old, and that the thermostat is hermetically sealed and cannot be accidentally or otherwise altered from the pre-set temperature. The alarm unit can be as far from the freezer as desired, and one alarm unit will handle as many freezers as can be conveniently connected to it. The system presents no electrical hazard since it operates only on 9 volt DC, either by dry cell battery, or by a connection to house current by the use of a 9 volt transformer. The design is compact and fool-proof and requires only two connections within the containers, such as a battery which snaps into place, and a thermostat wire which plugs into the side of the container.

What is claimed is:

1. An indicating apparatus for the temperature in a compartment of a refrigerator comprising:

a direct current source of electric energy such as a battery; said battery electrically isolated from any other source of electrical energy; hermetically sealed thermal responsive means adapted to be positioned within said compartment and in circuit with said source of electrical energy, electrical indicating means positioned outside said refrigerator and in circuit with said source of electrical energy, a detachable electrical connection in said circuit between said thermal responsive means and said indicating means, said thermal-responsive means being pre-set for an "off" position below a predetermined degree of temperature within said compartment, but adapted to be moved automatically to an "on" position, whenever the temperature in said compartment rises above said pre-set degree of temperature, switch means operable by said thermal responsive means to close the circuit through the indicating means in response to an increase of temperature in said compartment above said pre-set temperature, so as to give an indication that the temperature within such compartment exceeds said pre-set temperature of said thermal-responsive means, and timing means electrically connected to the circuit to detect the presence of electrical current through the electrical indicating means to determine how long the temperature within the compartment exceeds the pre-set temperature of the thermal-responsive means, said circuit between said source of electrical energy and the switch means being normally open so long as the temperature in said compartment is below said pre-set temperature of said thermal-responsive means.

2. An indicating apparatus according to claim 1 wherein:

a second switch is connected in circuit with said indicating means for testing the operability of said source of electrical energy and of said indicating means independently of the temperature in said compartment.

3. An indicating apparatus according to claim 1 wherein:

a container houses the indicating means and the second switch.

4. An indicating apparatus according to claim 3 wherein:

said container also houses the source of electrical energy.

5. An indicating apparatus according to claim 3 wherein:

said container also houses a detachable circuit connection between said switch means and said indicating means.

6. An indicating apparatus according to claim 5 wherein:

said switch means has terminal connectors adapted to be positioned outside said compartment and wherein said detachable circuit connector includes means for interconnecting said terminal connectors and said indicating means.

7. An indicating apparatus according to claim 1, wherein:

a plurality of said thermal responsive means are electrically connected in circuit with a plurality of compartments in one or more refrigerators.

8. An indicating apparatus according to claim 1 wherein said timer means records the amount of time electrical current flows within the circuit.

9. The indicating apparatus of claim 1 wherein the circuit further includes a test switch for activating said warning device to determine whether the powers output of said battery is sufficient to activate said device.

10. The indicating apparatus of claim 9 or 1 wherein the timing means comprises a meter face for recording the number of hours current has been flowing in the circuit and which continues to indicate how long current has been flowing after the temperature within the compartment has fallen below the pre-set value.

* * * * *